Dec. 11, 1956  J. F. GALBRAITH ET AL  2,773,970
METAL ARC WELDING APPARATUS
Filed Oct. 14, 1953
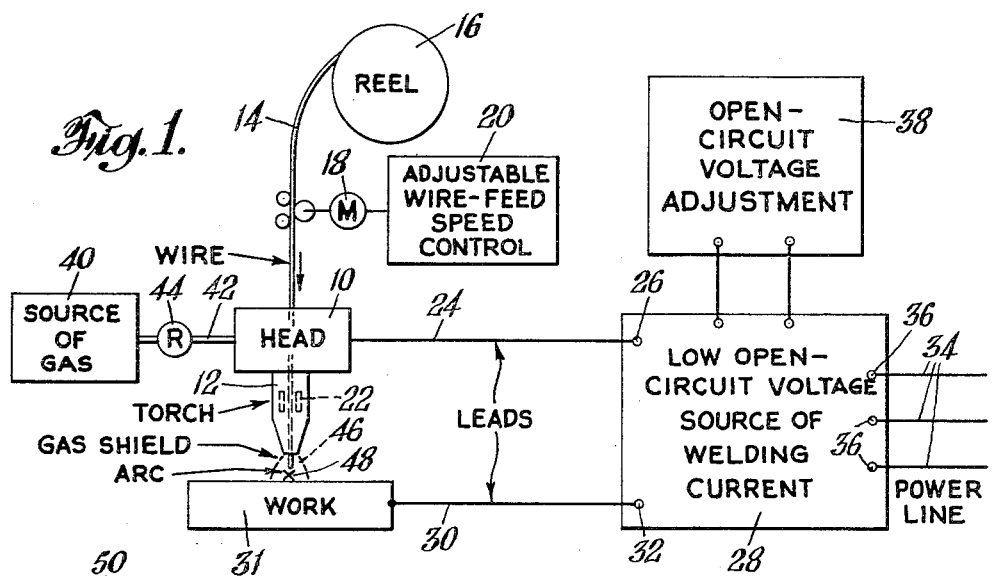
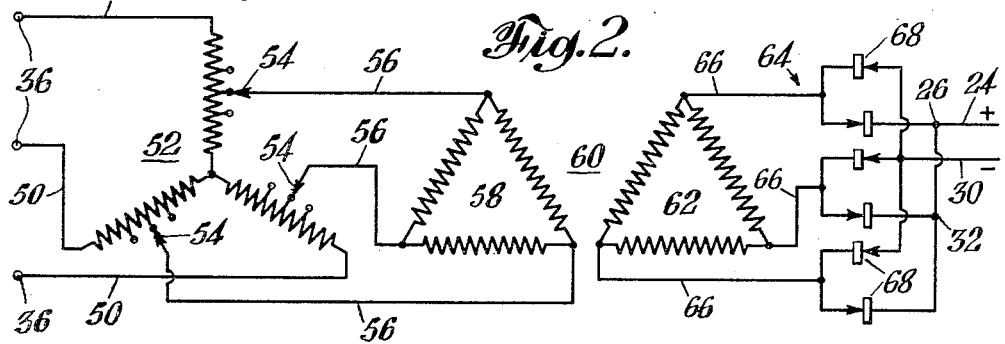
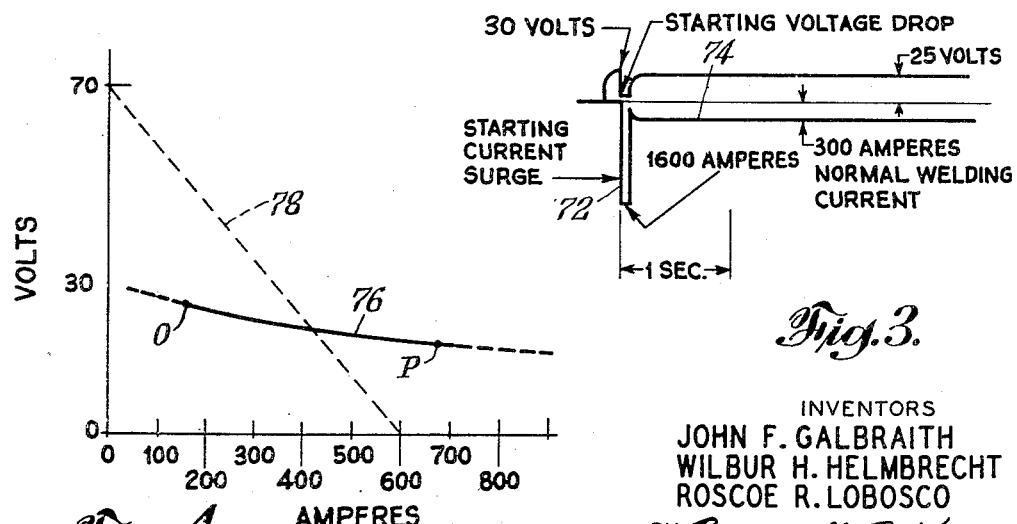
INVENTORS
JOHN F. GALBRAITH
WILBUR H. HELMBRECHT
ROSCOE R. LOBOSCO
BY Barnwell R. King
ATTORNEY

United States Patent Office 2,773,970
Patented Dec. 11, 1956

2,773,970

METAL ARC WELDING APPARATUS

John F. Galbraith, Plainfield, Wilbur H. Helmbrecht, Union, and Roscoe R. Lobosco, Fanwood, N. J., assignors to Union Carbide and Carbon Corporation, a corporation of New York Application October 14, 1953, Serial No. 386,048

4 Claims. (Cl. 219—131)

This invention relates to metal arc welding of the type in which a rod or wire electrode of fusible metal is fed at a relatively rapid preselected rate toward a work electrode of metal as fused metal is transferred from the end of the wire to the work through a welding arc formed therebetween, and more particularly to such welding in which the current is supplied by a welding power source having a relatively low open-circuit potential of the order of the usable welding voltage.

While not limited thereto the invention is very well suited for Sigma welding such as that disclosed by Muller et al. 2,504,868, and for submerged-melt welding such as as that disclosed by Jones et al. 2,043,960.

According to Kennedy 2,532,410 and 2,532,411 a substantially constant voltage, i. e., relatively flat (static) characteristic is provided by the source (generator) of welding current. The present invention is concerned with obtaining inherent advantages of the Kennedy process, with improved results and equipment that is relatively simple and easy to maintain.

This is accomplished according to the invention with a self-regulating source of welding current having a static volt-ampere characteristic the open-circuit potential of which is relatively low and which is not constant (flat) but droops in the operating (welding) current range, the slope, however, in such range, falling between one that is relatively flat and one that droops not more than one volt per fifty amperes or more of welding current in such operating range.

As the droop of the characteristic curve in the operating range increases beyond 1 volt in 50 amperes the degree of self-regulation of the arc is reduced.

According to the present invention, then, there is provided a metal arc welding system which consists essentially of a source of welding current capable of supplying a relatively high current surge very rapidly and having a relatively low open-circuit voltage which is adjustable, and a volt-ampere characteristic which has a droop within the range of continuous welding operation of not more than one volt per 50 amperes of welding current, in combination with a metal-arc welding head having a wire feed which is adjustable to provide a selected wire speed that is substantially constant.

In carrying out the invention the work and welding head are connected to the output terminals of such welding current source, and the wire feed is started. The welding action is stopped by simply stopping the wire feed.

The most important feature of the invention is that of self-regulation, i. e. once the desired arc-length (voltage) is set by adjusting the voltage of the source, depending upon the selected rod-feed speed, the system is entirely self-regulating. Some of the more important advantages of the present invention flowing from such self-regulation include the following: To stop the welding operation the rod feed is simply stopped. Because the arc voltage cannot go above that of the source, the arc goes out without melting (burning) back as far as the guide tube. An adjustable speed motor is used that feeds the rod at a constant preselected rate, in combination with a means to control the on-off operation of the motor. This simplifies the apparatus and insures positive operation at all times. Because of the above advantages, this invention is ideal for hand as well as automatic welding.

In the drawings:

Fig. 1 is a block diagram of a metal arc welding system illustrating the invention;

Fig. 2 is a circuit diagram of a source of welding current embodying the invention;

Fig. 3 is a representation (exaggerated as to time) of an oscillogram of the voltage and current traces of a "flying" start according to the invention; and Fig. 4 is a typical characteristic curve of a welding power source embodying the invention, compared with a conventional drooping characteristic.

As shown in Fig. 1 the illustrated welding system comprises a welding head 10 provided with a Sigma welding torch 12 through which an electrode wire or rod 14 is fed from a supply reel 16 by a rod-feed motor 18 at a substantially constant speed which is preselected by proper adjustment of a wire feed-speed control 20 associated with such motor. As the wire 14 passes through the head 10 it contacts a brush (guide tube) 22 which is connected by means including a lead (cable) 24 to an output terminal 26 of a welding power supply source 28. The other welding electrode, i. e., the work 31 is connected by a lead (cable) 30 to the other output terminal 32 of such source 28. A three-phase A. C. power line 34 is connected to the three input terminals 36 of the source 28 that is provided with suitable means 38 for adjusting the open circuit voltage across the D. C. output terminals 26, 32 thereof.

A source 40 of gas under pressure is connected to the head by a conduit 42 containing a regulator 44. The gas flows through the torch 12 emerging therefrom in a stream 46 which protects the arc 48 between the end of the wire 14 and the surface of the work 31 from the atmosphere.

The welding current source 28 may be any suitable one which meets the following requirements:

| Requirement | Reason |
|---|---|
| 1. V.-A. curve: Droop should not exceed 1 volt in 50 amps. in the operating range. | To provide maximum self-regulation of arc, and minimize voltage adjustment range. |
| 2. Speed of current response: As high as possible, preferably less than 0.01 sec. | To obtain maximum protection from burn-through during arc starting on relatively thin materials. |
| 3. Voltage adjustment: 15–45 volts (open circuit). | To ensure operation under various welding conditions. |

A polyphase transformer A. C.–D. C. full wave rectifier circuit, Fig. 2, employing dry-disc type rectifier stacks of selenium oxide, for example, is ideally suited for the purposes of our invention. The input terminals 36 are connected to a three-phase source of power the voltage of which is regulated so as to be substantially constant. Such terminals are, in turn, connected by conductors 50 to the terminals of a star-connected autotransformer 52 having adjustable taps 54 for changing the secondary voltage thereof as desired. Such taps are connected by leads 56 to the primary 58 of a three-phase transformer 60 having the secondary 62 thereof connected, in turn, to a full-wave rectifier bridge 64 by conductors 66. The primary and secondary windings of the transformer 60 are delta-connected, as shown, and the turns of the windings of the secondary 62 are adjustable to vary the output voltage thereof. The rectifier bridge 64 preferably consists of stacks 68 of selenium oxide plates suitably oriented electrically to change the A. C. input thereof to a D. C. output at the terminals 26 and 32.

In operation the circuit, Fig. 2, is adjusted so that the D. C. output voltage (open-circuit) across the terminals 26, 32 is between 15–45 volts, such as 30 volts, for example. In such case the current output available at such terminals for normal welding would be about 600 amperes, for example, for rods up to and including 3/32" diameter. The wire feed speed is set for say 300 inches per minute. Gas is supplied to the torch 12 and the rod-feed motor 18 is started. Arc welding conditions are self-established as indicated at 74 on the current trace which is smooth, indicating good stability. In no case does the voltage applied to the arc exceed the selected maximum potential at the terminals 26 and 32. As a result undesirable melting-back of the wire in the torch is obviated.

In order to assure such result the volt-ampere characteristic curve 76 of the source 28 should not fall more than one volt with a welding current increase of fifty amperes within the operating range O–P, Fig. 4. The maximum voltage of the source for protection from undesirable melting-back, which is generally referred to as "burn-back," of the wire, depends largely on the relative position of the guide tube to the workpiece and the kind of shielding gas employed. For example, in most welding applications, melting-back with argon as a shielding gas will occur at about 31 to 32 volts. If helium were substituted for the argon the melting-back voltage may be as high as 40. However, regardless of the melting-back voltage the opportunity for undesirable melting-back to occur will be minimized as the maximum voltage of the source decreases. A prior art relatively high open circuit-drooping characteristic curve 78 is shown in Fig. 4 for comparison.

Advantages of the invention include the following: The system is entirely self-regulating. Moving parts and automatic controls are reduced to a minimum. The operation is stable by virtue of the characteristic curve drooping slightly within the operating (welding) range. Only two settings need to be made—depending upon the rod or wire used—(1) the output voltage of the source 28, and (2) the rod-feed (welding) speed. The system is entirely free of any "shock" hazard to the operator by virtue of the safe welding voltage which never exceeds a relatively low value.

The invention is suitable for use with any metal and with any suitable arc shielding gas or gases including the vapor derived from the operation, that is to say, the process can be used with shielding gases derived from rod coatings or comminuted, prefused compositions, such as submerged-melt welding flux.

We claim:

1. Metal arc welding apparatus comprising the combination of an A. C.–D. C. rectifier source of welding current provided with means for adjusting the output potential thereof, at a selected open-circuit potential of between 15 and 45 volts, and a metal arc welding device provided with means for feeding a welding wire electrode at an adjustable substantially constant preselected speed toward work to be welded, and means including welding leads for conducting current supplied by said source through the end of such wire and the work to energize a welding arc therebetween, the volt-ampere characteristic of the direct current output of said rectifier source having a droop of not more than one volt per fifty amperes increase in current, in the operating range thereof, whereby the welding operation is stabilized.

2. Metal arc welding apparatus comprising the combination of a transformer, means for connecting the primary of said transformer to an alternating current source, a rectifier connected to the secondary of said transformer, having D. C. output terminals, a metal arc welding device provided with means for feeding a welding wire electrode at a substantially constant preselected speed toward work to be welded, and means including welding leads connected to said terminals for conducting current supplied by said source through the end of such wire and the work to energize a welding arc therebetween, the volt-ampere characteristic of the direct current output of said source having a droop in the welding operating range thereof of not more than one volt per fifty amperes increase in current.

3. Metal arc welding apparatus comprising the combination of a source of welding current including star-connected three phase auto-transformer provided with means for adjusting the output voltage thereof, a three-phase delta-connected transformer having the primary thereof connected to the output circuit of said auto-transformer, means for adjusting the output voltage of said delta-connected transformer, and a three-phase full-wave rectifier bridge having an input circuit connected to the output circuit of said delta-connected transformer, said rectifier bridge comprising six selenium oxide-plate type rectifier units arranged in a D. C. output circuit the terminals of which are at a selected open-circuit potential difference, and a metal arc welding device provided with means for feeding a welding wire electrode at a substantially constant preselected speed toward work to be welded, and means including welding leads connected to said terminals for conducting current supplied by said source through the end of such wire and the work to energize a welding arc therebetween, the volt-ampere characteristic of the direct current output of said source having a droop in the operating range of not more than one volt per fifty amperes increase in current, whereby the welding operation of said device is stabilized by the cooperation of said constant feed and said source characteristic.

4. Continuous wire electrode arc apparatus comprising the combination with a head provided with torch means for guiding a wire electrode toward the work while conducting arc current to such electrode wire, means for feeding such wire electrode through said head at a wire-feed speed that is adjustable, a star-connected auto-transformer adapted to be connected to a three-phase source of alternating current source the voltage of which is regulated so as to be substantially constant, said auto-transformer having adjustable taps for changing the secondary voltage thereof as desired, a three-phase transformer having delta-connected primary and secondary windings, means connecting the taps of said star-connected auto-transformer to said primary winding, a full-wave rectifier bridge connected to said secondary winding, and leads connecting the direct current output of said bridge to said head and work respectively, the inherent characteristic of such transformer-rectifier combination being such that current corrections take place sufficiently rapidly and over a range wide enough to satisfy the demands of a direct current arc established between such work and the end of such electrode wire within an arc voltage drooping limit that does not exceed 1 volt per 50 amperes in the normal operating range of the arc as such electrode wire is fed toward such work and melted by such arc.

References Cited in the file of this patent

UNITED STATES PATENTS

| | | |
|---|---|---|
| 2,205,208 | Kubler | June 18, 1940 |
| 2,444,834 | Landis et al. | July 6, 1948 |
| 2,504,868 | Muller et al. | Apr. 18, 1950 |
| 2,680,181 | Tuthill et al. | June 1, 1954 |